Nov. 9, 1937.  J. M. NASH  2,098,876
HYDRAULIC POWER PLANT
Filed Jan. 3, 1936  2 Sheets-Sheet 1
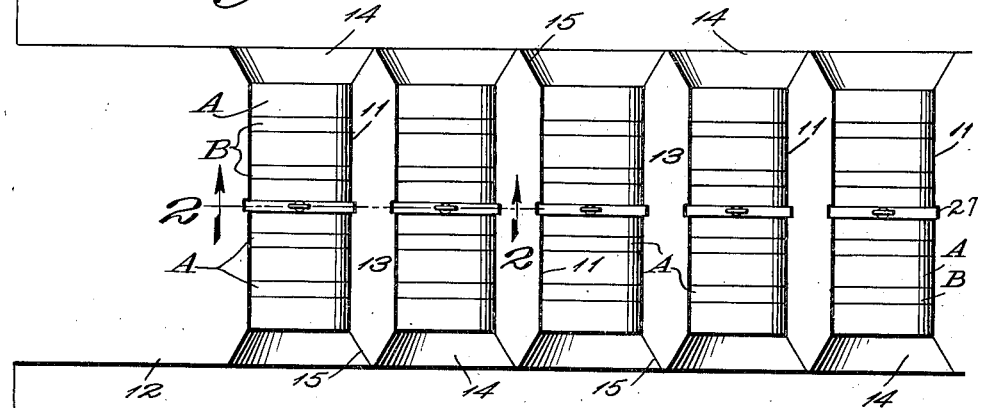
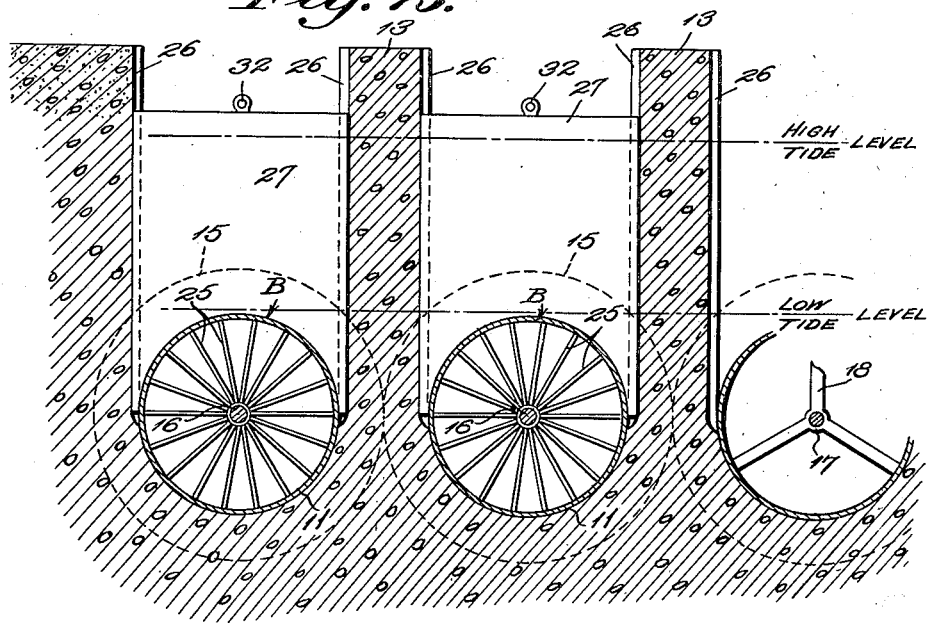
John M. Nash
INVENTOR
BY Victor J. Evans & Co.
ATTORNEY Nov. 9, 1937.   J. M. NASH   2,098,876
HYDRAULIC POWER PLANT
Filed Jan. 3, 1936   2 Sheets-Sheet 2
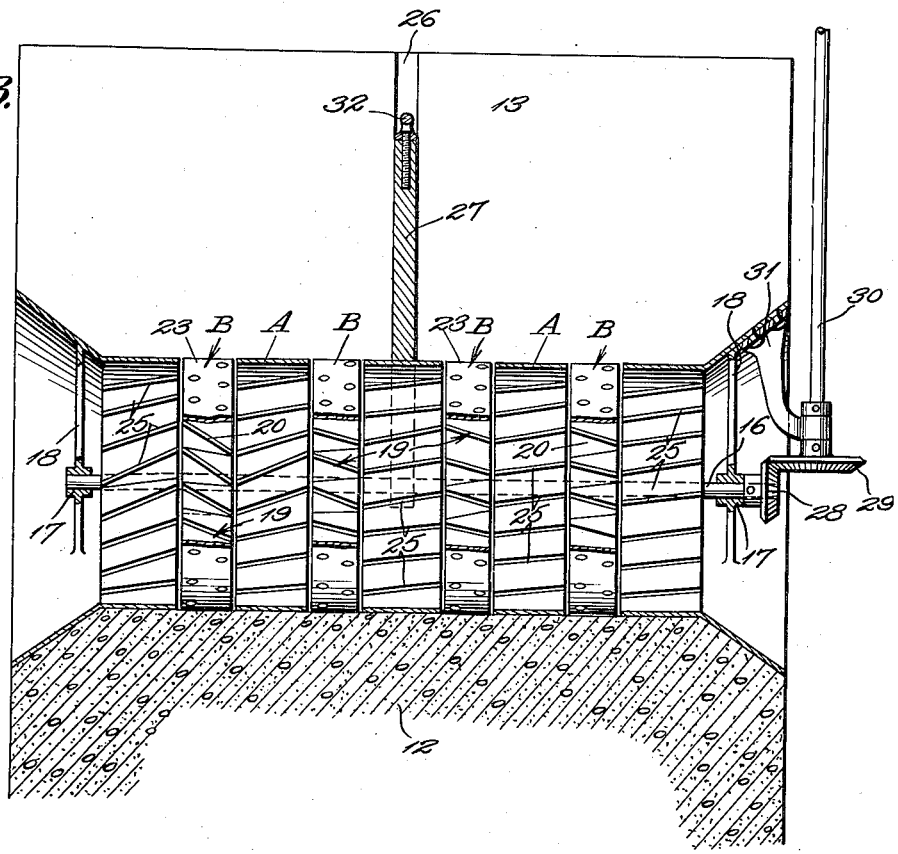
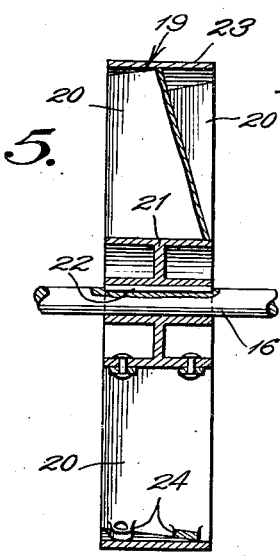
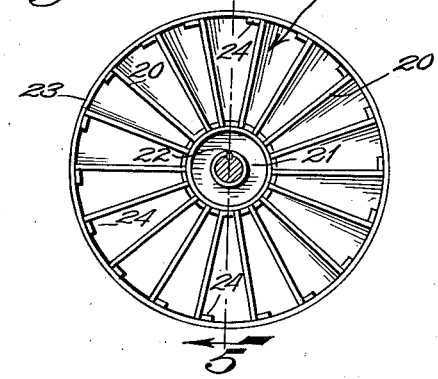
John M Nash
INVENTOR
BY Victor J. Evans & Co.
ATTORNEY Patented Nov. 9, 1937

2,098,876

UNITED STATES PATENT OFFICE 2,098,876

HYDRAULIC POWER PLANT

John M. Nash, Lakeland, Fla.

Application January 3, 1936, Serial No. 57,421

1 Claim. (Cl. 61—20)

The invention relates to a water wheel and more especially to a hydraulic power plant for use in water courses.

The primary object of the invention is the provision of a plant of this character, wherein through the service of water wheels operated from ocean or river tides will develop power to be utilized by communities for generating current, driving machinery or for other purposes, the plant being of novel construction so that the water currents will operate the water wheels to assure maximum power to be derived from said plant.

Another object of the invention is the provision of a plant of this character, wherein the construction of the same is novel to assure smooth operation and the production of maximum power acquired from water currents either at high or low tides as within a river, ocean or water course.

A further object of the invention is the provision of a plant of this character, which is comparatively simple in construction, thoroughly reliable and efficient in its operation, durable, assured of smooth running, and inexpensive to manufacture and install.

With these and other objects in view, the invention consists in the features of construction, combination and arrangement of parts as will be hereinafter more fully described, illustrated in the accompanying drawings, which disclose the preferred embodiment of the invention and pointed out in the claim hereunto appended.

In the accompanying drawings:

Figure 1 is a top plan view of a plant constructed in accordance with the invention and shown situated crosswise of a water way or course.

Figure 2 is a fragmentary enlarged sectional view taken on the line 2—2 of Figure 1 looking in the direction of the arrows.

Figure 3 is a vertical longitudinal sectional view through the plant.

Figure 4 is a side elevation of one of the water wheels.

Figure 5 is a sectional view on the line 5—5 of Figure 4 looking in the direction of the arrows.

Similar reference characters indicate corresponding parts throughout the several views in the drawings.

Referring to the drawings in detail, the plant constituting the present invention comprises series of alternately arranged stationary and rotary cylinders A and B, respectively, these being disposed horizontally in parallel relation to each other and within water channels 11 built with a concrete foundation 12 and spaced upstanding walls 13 accommodating snugly therebetween the said cylinders A and B, the latter being located at the lowermost point or bottoms of the channels 11. This concrete foundation 12 with its upstanding vertical walls 13 is disposed crosswise of a river or water course to lie transversely of the directional flow of the water.

The cylinders A at opposite ends of the channels 11 are formed with flared open ends 14, the walls at the vertical edges next to said ends 14 being reversely beveled at 15 in conformity with the flared ends 14 which latter are flush with these edges of said walls.

Longitudinally disposed centrally within the said cylinders A and B are wheel shafts 16, these being journaled in bearings 17 of centering brackets 18 which are built within the flared ends 14 of the outer cylinders A. Upon each shaft 16 are carried the cylinders B, these being built as bladed water wheels 19, the blades 20 of these being angularly disposed and are directed radially from the hub 21 which is splined or keyed at 22 to said shaft. The water wheels 19 each at its outer periphery thereof is closed by a rim 23 to which is fastened the ears 24 cut and bent from the outer ends of the said blades.

Arranged between the water wheels 19 and beyond the series thereof are guide or directing blades or veins 25, these being set at reverse angles to the blades 20 of the wheels 19 and radially extended from the shafts 16, the said blades 25 being suitably fixed in this position to the cylinder A and the alternate disposition of the cylinders A and B in a horizontal plane within the channels 11 constitute a tide motor or a hydraulic power plant.

Midway of each channel 11 and created in the proposed faces of the vertical walls 13 are vertical grooves 26 in which are fitted vertical slidable gates 27 which when in lowered position close the channels 11 above the cylinders A and B and are operated for high and low tide conditions of the body of water when flowing through the channels 11. Each shaft 16 carries a gear 28 meshing with a companion gear 29 on a driven shaft 30, this being journaled in a bearing bracket 31 suitably fixed, and through the shaft 30 power from the plant can be transferred as will be apparent from Figure 3 of the drawings.

Each gate 27 at its top edge has fitted therein an eye 32 for the connection therewith of a lift mechanism (not shown).

The plant is serviceable in water channels, passes or river courses where water is going out or coming in so that the water currents passing through the cylinders A and B will be effective for the driving of the water wheels 19 and a maximum power is attained through the use of the plant.

What is claimed is:

A plant of the character described comprising a vertical wall disposed crosswise of a water-way and having a plurality of spaced vertical straight water courses therein extending throughout the entire thickness of the wall, a series of alternately arranged stationary and rotary cylinders located within said water courses at the bottoms thereof, shafts disposed centrally of said cylinders, water wheels fixed to said shafts within said rotary cylinders and including a hub and blades directed radially from the hub and angularly disposed, directing blades fixed within said stationary cylinders and radially extending from said shafts and disposed at reverse angles to said first mentioned blades, and gate means disposed within the water courses for regulating water flow through said cylinders and the water course above such cylinders.

JOHN M. NASH.